April 19, 1927.
A. P. ANDERSON
1,625,185
AUTOMATIC FLUID CONTROLLING DEVICE
Filed May 29, 1922        3 Sheets-Sheet 1
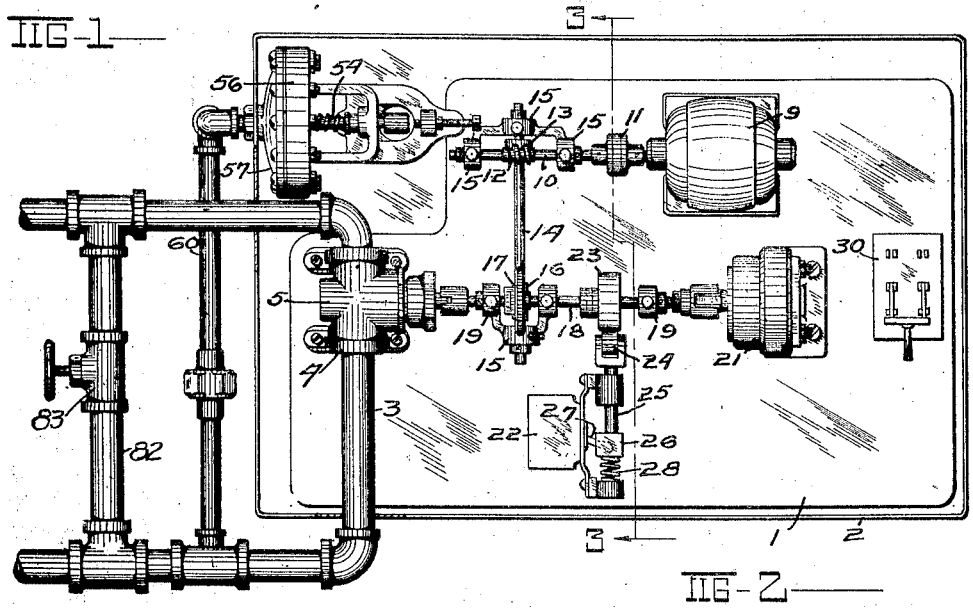
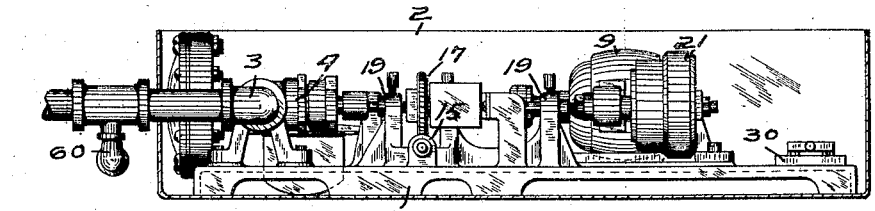
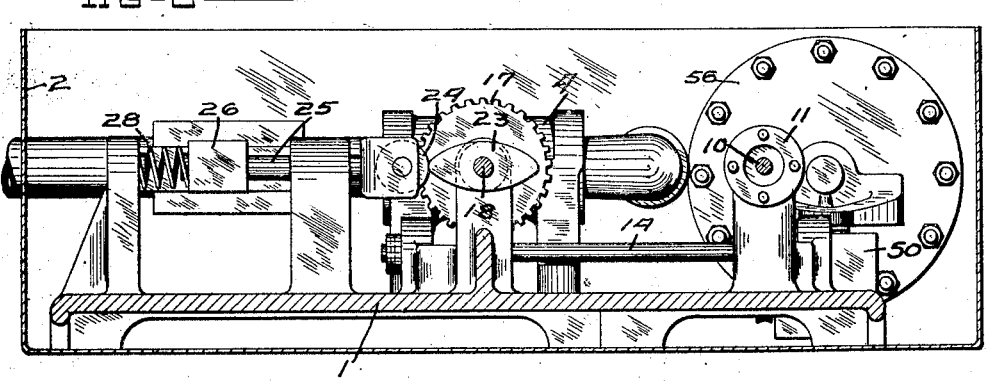
INVENTOR
August P. Anderson
by
Owen Owen & Crampton

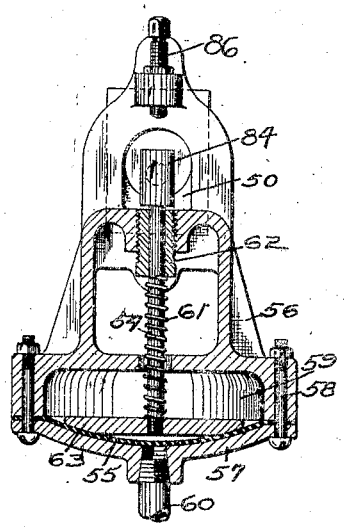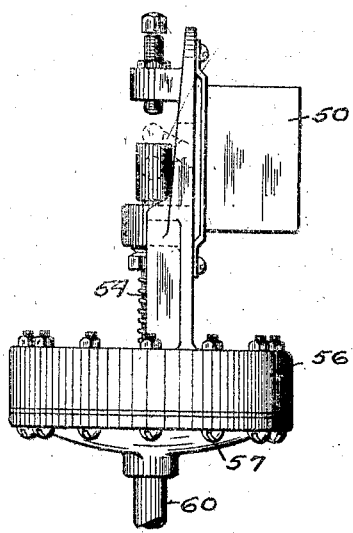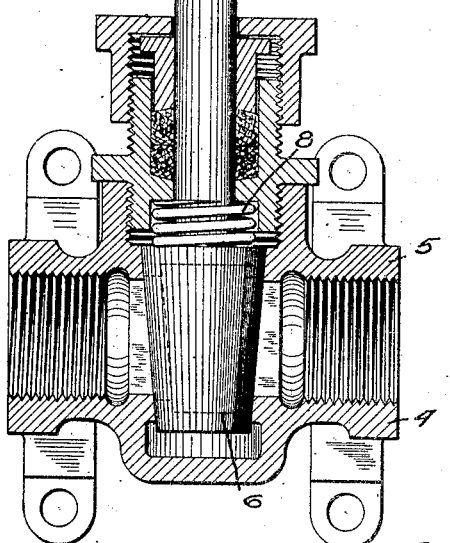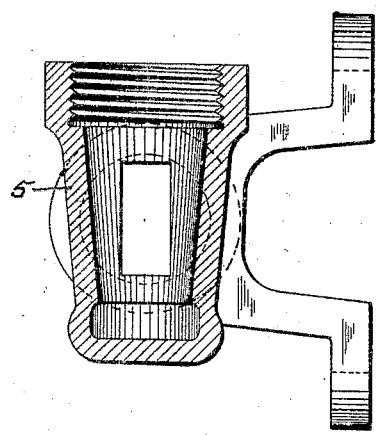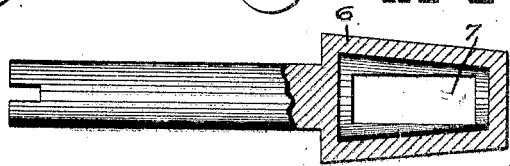

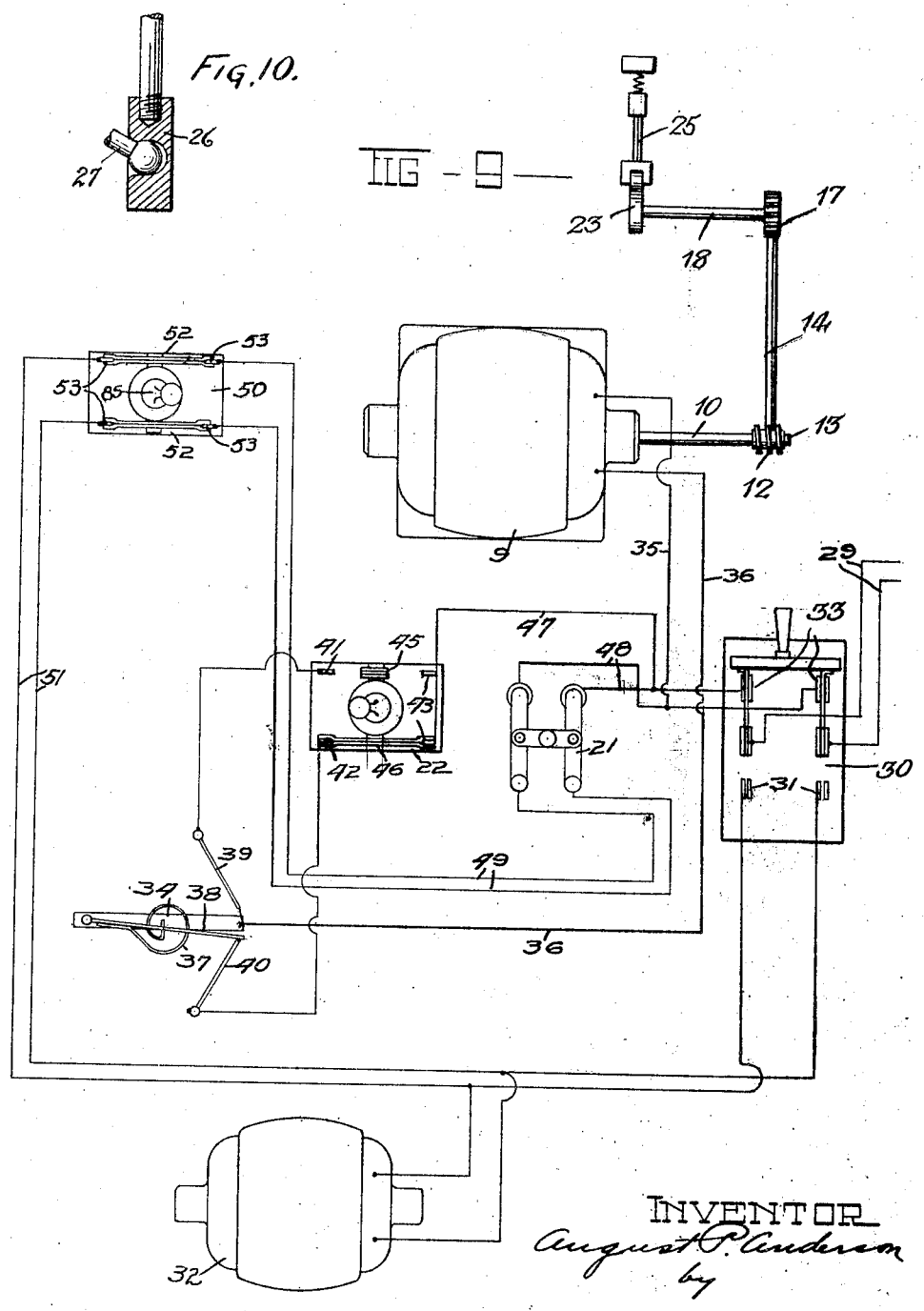

Patented Apr. 19, 1927.

1,625,185

UNITED STATES PATENT OFFICE.

AUGUST P. ANDERSON, OF TOLEDO, OHIO.

AUTOMATIC FLUID-CONTROLLING DEVICE.

Application filed May 29, 1922. Serial No. 564,439.

My invention has for its object to provide an efficient controlling device for automatically controlling fluid, that is, a gas or liquid of any kind, in a suitable pipe or system, or to control the pressure of the fluid in such a pipe or system, by a means actuated according to conditions that are to be maintained in such a system. The invention particularly has for its object to provide a device whereby the flow of a fluid may be regulated according to predetermined pressure or thermal conditions that it is desired to maintain.

The invention may be contained in constructions of different forms. To illustrate a practical application of the invention I have selected a structure or system containing the invention as an example of embodiments of my invention and will describe the construction hereinafter. The construction or system selected is illustrated in the accompanying drawings.

Figure 1 of the drawings is a top view of the controlling device. Fig. 2 illustrates a side view of the device illustrated in Fig. 1. Fig. 3 illustrates a sectional view of the device taken on the line 3—3 indicated in Fig. 1. Fig. 4 illustrates a sectional view of one of the parts of the device illustrated in Fig. 1 which operates according to the fluid pressure existing in some part of the system that is controlled by the device. Fig. 5 is a side view of the part of the device illustrated in Fig. 4. Fig. 6 is a sectional view of a direct plug valve. Fig. 7 is a sectional view of a part of the valve illustrated in Fig. 6, taken on a plane located at right angles to the plane in which the section shown in Fig. 6 is taken. Fig. 8 illustrates a sectional view of the plug of the valve. Fig. 9 illustrates diagrammatically the electrical connections between the parts constituting my invention. Fig. 10 is a sectional view of the means for connecting one of the parts to a switch, also illustrated in Fig. 1. In Figs. 1, 2 and 3, 1 is a base that may be located in a box 2 which may be provided with a suitable cover for enclosing parts of the device.

The particular structure illustrated in Figs. 1, 2 and 3 is to control the flow of water in any apparatus, such as a refrigerating apparatus, and also to control a motor which may be used, as in the particular example selected, for operating the compressor of a refrigerating apparatus. The pipe 3 is connected with a source of water supply and also to the refrigerating apparatus whereby the parts of the refrigerating apparatus, such as the pressure cylinder of the compressor and the condenser, etc., may be cooled in the manner well known in the art. The pipe 3 may be connected to the controlling device whereby the refrigerating apparatus is automatically cooled, or, if desired, the controlling device may be used to control the motor dependent of the control of the water flow, or if desired, the controlling device may be completely cut off from the control of the water pressure and control of the motor. The water may be short-circuited if desired through the pipe 82 in which the valve 83 is located. If the water flow is to be controlled by the device the valve 83 is closed, which causes the water to flow through the pipe 3. The pipe 3 is provided with a valve 4 having the casing 5. The valve 4 is an ordinary direct or plug valve. It is provided with a suitable tapered plug 6 which seats in the casing 5. The plug is provided with the usual straight-way opening 7. The valve is therefore opened and closed by merely giving the plug a quarter of a turn either to the right or to the left.

The valve is provided with a suitable spring 8 to maintain the plug 6 seated in position in the valve case. The valve is also provided with suitable packing nuts or rings and packing material so as to maintain the valve tight as against any leakage in the manner well known in the art. The valve operates to control the water flow through the pipe 3 to the refrigerator and at the same time control the motor that operates the refrigerating apparatus.

The valve is operated to open and close the pipe leading to the refrigerating apparatus by means of a motor 9 which reduces the pressure in the pipe 60. The motor 9 is connected to a shaft 10 by means of a suitable universal or flexible coupling 11. A worm 12 is located on the shaft 10 and operates a worm wheel 13 located on a shaft 14. The shafts 10 and 14 are located in suitable bearings 15 that are supported in brackets that are secured to the base 1 of the device. The shaft 14 is also provided with a worm 16 that also operates on a worm wheel 17 which is connected to the shaft 18. The shaft 18 is also supported in suitable bearings 19 which are located in brackets supported on the base 1 of the device. The shaft 18 is connected to the plug 6 of the valve to open and close the passageway through the valve.

When the valve is opened the motor 9 operates to give the valve a quarter of a turn to close it under certain predetermined conditions that may arise in the system to be controlled by the device, and when the valve is closed the motor likewise gives the valve a quarter of a turn to open the valve when it is desired to maintain predetermined conditions in the system. The motor 9 is electrically controlled by devices which are actuated according to the conditions that may exist or according to conditions that it is desired to maintain in the system. The limitation of the operations of the motor 9 being to give the valve plug a quarter of a turn, to open or to close the valve, its circuit is opened when the quarter of a turn has been accomplished in the valve. Since the motor 9 in its operations is limited to a quarter turn of the valve, a snap switch 21 which is also connected to the shaft 18 operates to open or close the circuits of the refrigerating motor by a quarter of a turn. When the shaft 18 has been given a quarter of a turn the snap switch 21 will be operated to cause the movable contacts to snap to either a closed or open position. The snap switch 21 operates to close the circuit to the motor of the refrigerating apparatus when the valve is open. A second switch 22 is also operated by the shaft 18 to open the circuit of the motor 9 when the shaft 18 has completed a quarter of a turn to close and open the valve and at the same time to open and close the switch 21.

The switch 22 is also a snap switch and is operated by a double cam 23 located on the shaft 18 and by means of a roller 24 located on the sliding shaft or pin 25. The pin 25 is supported in a suitable bracket that is also secured to the base 1 of the device for sliding longitudinal movements relative to its supporting bracket. It is provided with a block 26 in which is socketed the actuating lever or arm 27 of the switch, which operates to open the circuit of the motor 9 and cause the cessation of the operations of the motor 9 when it has completed a quarter of a turn to open or close the valve 4. The roller may be held in position against the cam 23 by a spring 28 which is located between the end of a suitable bracket and the block 26.

The motor 9 and the motor for operating the refrigerating apparatus are actuated by a source of current that is connected through the leads or main line 29 to the manually operated switch 30. The switch 30 is provided with a pair of contacts 31 that connect the movable contacts or the knife blades of the switch to the motor 32 of the apparatus controlled by the device embodying my invention, when the blades are in one position. The switch 30 is also provided with the contacts 33 that connect through the blades of the switch with the main line 29 when the switch is in another closed position. The motor 32 of the apparatus may thus be connected directly to the main line 29 or may be connected with the automatic controlling device embodying my invention. In the form of the connection shown in Fig. 9, the motor 32 is controlled thermostatically according to the heat conditions that may exist in some part of the refrigerating apparatus or that may exist at some point, the temperature of which it is desired to be controlled by the device embodying my invention.

In the arrangement shown in Fig. 9 the refrigerating apparatus is controlled by controlling the motor 32 through the operation of the thermostat 34 which is connected to one of the main lines 29 through the contacts 33 of the switch 30. The thermostat 34 is connected to one of the contacts 33 through the motor 9 by means of the lines 35 and 36. The thermostat 34 is provided with a couple 37 that is thermically moved from one point to another according to the heat conditions that the thermostat may be subjected to. The couple is provided with a contact 38 that makes contact either with the contact 39 or the contact 40 according to the heat conditions to which the thermostat is subjected. When the temperature of the room or the surrounding atmosphere in which the thermostat is located reaches a certain predetermined low point according to the adjustment of the thermostat the contact 38 makes contact with the contact 39 and completes a circuit from the line 36 to the contact 39, and when the temperature that actuates the thermostat reaches a predetermined high point the contact 38 makes contact with the contact 40. The contacts 39 and 40 are connected to contacts 41 and 42 of the switch 22 which is operated by the double cam 23 (see Fig. 1). The switch 22 is also provided with a common contact or with two contacts connected together, such as the contacts 43. The contacts 41 and 43 are connected together by the movable contact 45, while the other contact 43 is connected with the contact 42 by a similar movable contact 46 which is located at right angles to the contact 45, that is, when the contact 45 is in a closed position the contact 46 is in an open position, and vice versa. The contacts 43 are connected to the remaining lead line 29 through the line 47 and the contacts 33 of the switch 30. This completes the circuit of the motor either through the movable contact 45 or the movable contact 46 when the thermostat contact 38 makes contact either with the low temperature contact 39 or the high temperature contact 40, it being understood that the contact arms 45 and 46 of the switch 22 are in the reverse position of high or low according to the last position taken by the contact 38 of the thermostat; that is, the contact 38 makes contact with one or the other of the contacts subsequent to a movement of the switch 22, and hence the contact 39 or 40 with which the contact 38 makes contact is completed through the switch 22 by either the arm 45 or 46. Thus when the apparatus has been actuated by reason of the high temperature the switch 22 is thrown into a position to connect the contacts 41 and 43. When the temperature surrounding the thermostat is lowered and the contact 38 makes contact with the contact 39, the circuit is completed through the switch 45, the line 47 to the lead line 29. The motor 9 is actuated by the current passing through its armature and field through the lines 35 and 36, which operates the switch 22 through the cam 23 to place the contact arm 46 of the switch 22 into connection with the contacts 42 and 43 and so that when the contact 38 makes contact with the contact 40 the motor will again be actuated. The switch 22 is not operated until the cam 23 has completed a quarter of a turn, namely, when the roller 24 has been either forced to its outermost position by the cam or when the short radii of the cam are in axial alignment with the pin 25 that carries the roller 24. This change of circuit connections being accomplished through the switch 22 upon the performance of a quarter of a turn of the shaft 18, the motor circuit 9 is immediately opened but the switch 22 is set for the subsequent operation of the motor 9.

The turning of the shaft 18 causes the switch 21 to be turned a quarter of a turn to close or open the switch and the valve plug 6 is also turned a quarter of a turn, as heretofore described. The switch 21 is closed when the valve 4 is open so that when the thermostat is lowered in temperature and contact is made with the contact 39 the circuit through the switch 21 is opened, but when contact is made with the contact 40 of the thermostat through the operation of the motor 9 the switch 21 is closed. This is when the temperature surrounding the point to be controlled thermostatically is high.

When the switch 21 is closed the circuit is completed from the blades of the switch 30 through the contacts 33, the lines 48, the switch 21, lines 49 to and through the pressure switch 50, and thence through the lines 51 to the motor 32 of the refrigerating apparatus. This causes the motor 32 to be actuated, which causes a reduction of the temperature. The refrigerating apparatus is thus operated until the thermostat responding to the reduction in the temperature produced by the operation of the motor 32, again completes the circuit through the motor 9 and causes the actuation of the switch 21 and also of the valve 4. The current through the motor 9 is shut off and also the flow of the water through the pipe 3 is stopped which raises the pressure in the pipe 60 and causes the switch 50 to be opened and thus the motor 32 ceases to operate. It will thus be seen that I have provided a means whereby the flow of the water through the parts of the refrigerating apparatus is controlled, so that the water is immediately shut off when the refrigerating apparatus ceases to operate to reduce the temperature below the predetermined point as determined by the setting of the adjustable parts of the thermostat. This results in the saving of the water during the cessation of the operations of the refrigerating apparatus.

I have also provided a safety means whereby the refrigerating apparatus will not be operated if the cooling medium is not functioning, as for instance, if there is no flow of water through the pipe 3 to cool parts of the refrigerating apparatus. The motor 32 is also controlled by the pressure in the pipe 3, and so that the motor 32 will not be operated unless the apparatus is in condition for operation.

In order to permit the motor 32 to be operated only when a flow of a cooling medium may exist through the parts to be cooled, the switch 50 is located in the circuit of the motor 32, unless the motor 32 is connected directly to the main lines 29. The switch 50 is provided with a pair of movable contact arms 52 which simultaneously make contact with the terminals or contacts 53 of the switch when the switch 50 is closed. The switch 50 is operated by the spring pressed plunger 54 which is actuated by the diaphragm 55. The diaphragm 55 is secured in a housing 56 and is connected to the housing 56 by means of the cap 57. The diaphragm 55 is sealed between the cap 57 and the body of the housing 56 by means of the bolts 58 that extend through the peripheral portion of the diaphragm 55 and clamp the periphery of the diaphragm between the cap 57 and the body portion of the housing 56. The housing 56 thus provides a chamber 59 that communicates with the atmosphere. One side of the diaphragm is subjected to the pressure of the spring pressed plunger 54. The cap 57 is connected by means of the pipe 60 to the pipe 3 and thus that side of the diaphragm 55 is subjected to the pressure of the fluid, such as water, when it is under pressure in the pipe 3. When the water is in condition to flow through the refrigerating apparatus its pressure is transmitted through the pipes and against the diaphragm 55 which causes the diaphragm 55 to distend or move from the cap 57 and against the spring pressed plunger 54.

The plunger 54 is operated in one direction to press the diaphragm 55 towards the cap 57 by the spring 61 which is located between the adjusting nut 62 and the plunger head 63. The nut 62 is located in the housing 56 and is adjusted according to the spring tension required to operate the switch 50. Also the nut 62 is adjusted according to the pressure of the water that may exist in any particular locality in which the refrigerating apparatus may be located, and according to the predetermined low pressure point of the water in the pipe 3 that will cause the switch 50 to be operated, that is, that will cause the switch 50 to be opened. The plunger 54 is connected to the switch 50 by means of a block 84 which is provided with a socket for receiving the end of the actuating lever 85 of the switch 50. This connection is substantially the same as the connection between the block 26 and the switch 22. For limiting the outward movement of the plunger 54 by the operation of the diaphragm 55 an adjustable stop 86 may be provided against which the block 84 will abut.

I have thus provided a means whereby the refrigerating apparatus may not only be automatically controlled, but will not be operated unless the conditions are such that it should be operated, it being understood that the controlling switch 50 may be used to control apparatus other than refrigerating apparatus and according to the conditions requisite for the proper operation of such other apparatus.

The different parts of the mechanism are provided with suitable adjusting devices in order to insure the proper timing and setting of the parts.

I claim:

1. In an automatic refrigerant controlling device for electric thermic systems, a source of current, a source of cooling water, an electric motor for operating the thermic system and connected to the said source of current, a second motor connected to the source of current, cooling pipes connected to the source of supply of water, a valve for regulating the flow of the water, a switch for connecting the first named motor with the said source of current, an enclosed diaphragm connected to the said switch the said diaphragm operated by the pressure of the water in the said pipes and controlled by the said valve, a thermostatic switch having high and low temperature contact points, a switch located in the circuit of the second motor for connecting the second motor with the said circuit and operated by the second motor when the valve has been opened and when it has been closed to connect the second motor to the low temperature contact point and the high temperature contact point of the thermostat respectively.

2. In an automatic refrigerant controlling device for electric thermic systems, a source of current, a source of cooling water, an electric motor for operating the thermic system and connected to the said source of current, a second motor connected to the source of current, cooling pipes connected to the source of supply water, a valve for regulating the flow of the water, a snap switch for connecting the first named motor with the said source of current, an enclosed diaphragm connected to the said switch the said diaphragm operated by the pressure of the water in the said pipes and controlled by the said valves, and operating the switch to close the circuit when the pressure of the water has reached a predetermined point, a thermostatic switch having high and low temperature contact points, a snap switch located in the circuit of the second motor for connecting the second motor with the said circuit and operated by the second motor when the valve has been opened and when it has been closed to connect the second motor to the low temperature contact point and the high temperature contact point of the thermostat respectively.

In testimony whereof I have hereunto subscribed my name to this invention.

AUGUST P. ANDERSON.